Nov. 27, 1951  H. T. R. HANITZ  2,576,341
AUTOMATIC TRANSFER MACHINE TOOL
Filed April 21, 1948  7 Sheets-Sheet 1

Fig. 1

INVENTOR
Hans T. R. Hanitz
By Carlson, Pitzner, Hubbard & Wolfe
ATTORNEY

Nov. 27, 1951     H. T. R. HANITZ     2,576,341
AUTOMATIC TRANSFER MACHINE TOOL

Filed April 21, 1948     7 Sheets-Sheet 6

INVENTOR
Hans T. R. Hanitz
By Carlson, Pitzner, Hubbard & Wolfe
ATTORNEY

Nov. 27, 1951     H. T. R. HANITZ     2,576,341
AUTOMATIC TRANSFER MACHINE TOOL Filed April 21, 1948     7 Sheets-Sheet 7

INVENTOR
Hans T. R. Hanitz
By Carlson, Pitzner, Hubbard & Eft
ATTORNEY

Patented Nov. 27, 1951

2,576,341

UNITED STATES PATENT OFFICE 2,576,341

AUTOMATIC TRANSFER MACHINE TOOL

Hans T. R. Hanitz, Rockford, Ill., assignor to The Ingersoll Milling Machine Company, Rockford, Ill., a corporation of Illinois Application April 21, 1948, Serial No. 22,464

3 Claims. (Cl. 90—21)

This invention relates to machine tool organizations of the type in which a row of workpieces are advanced simultaneously and step-by-step to bring each successive piece into operative association with one or more material removing tools which may also be spaced along the line of advance of the pieces.

One object is to provide a machine tool organization of the above character in which an elongated support or reciprocating table to which the workpieces are clamped while being machined is also utilized in a novel manner as the means for transferring the workpieces step-by-step along the production line.

A more detailed object is to provide mechanism operable after each advance of the workpieces and machining thereof to transfer the workpieces transversely of the path of table travel and clear of the table and supporting fixtures and hold the workpieces in out of the way positions during retraction of the table to present each fixture to the next workpiece.

Another object is to correlate the motions of the table with the gripping, lateral transferring and releasing of the workpieces, so that all of the functions may be performed in an automatically executed machine cycle.

A further object is to provide novel mechanisms for facilitating the loading of workpieces onto the work table and unloading machined workpieces off from the latter.

The invention also resides in the novel structural character of the mechanism employed for gripping and transferring the plurality of workpieces.

Other objects and advantages of the invention will become apparent from the following detailed description taken in connection with the accompanying drawings, in which.

While the invention is useful in machines for performing various kinds of material removing operations to form or finish holes or surfaces, it is shown in the drawings incorporated in a multiple station machine for rough and finish milling opposite sides 10 and 11 of a workpiece W. It will be understood, however, that the invention is not limited to such operations nor to the specific structure of the various operating mechanisms, but is intended to cover all modifications and alternative constructions and arrangements falling within the spirit and scope of the appended claims.

For the application illustrated, the milling operations are preferably performed while the workpieces W, while clamped to an elongated support or table 12, are being advanced along the production line from one position to the next, thereby minimizing the length of each machine cycle. Herein, the rough milling is effected by cutters 13 while each workpiece is being carried by the table from position b (Figs. 6 to 10) to position c, and then, in the next advance of the workpiece to position d, the sides are finish milled by cutters 14.

Figure 1:
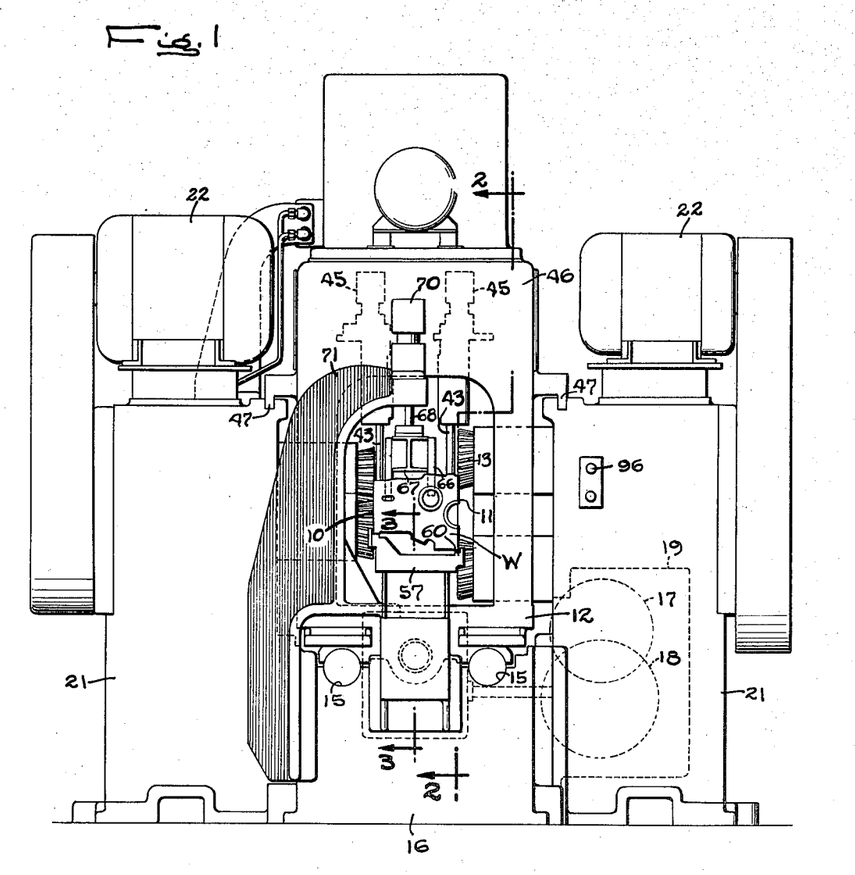
Figure 1 is an end elevational view of a machine tool organization embodying the novel features of the present invention, the view being taken from the loading end looking along the line of advance of the workpieces through the machine.

The work table 12 is slidable back and forth along horizontal guideways 15 (Fig. 1) formed on a bed 16 which is elongated so as to extend, in this instance, through an idle or work loading position a, spaced operating positions b and c and a position d from which the finished workpieces are unloaded from the table. The table is reciprocated back and forth through a distance equal to the spacing of the work positions above referred to, this being accomplished herein either by an electric feed motor 17 (Fig. 6) or a rapid traverse motor 18 operating through suitable differential and speed reduction gearing 19 to actuate a screw and nut 20 or other suitable transmission.

The two sets of cutters 13 and 14 above referred to are fixed to spindles which are journaled in and project inwardly from columns 21 (Fig. 1) upstanding from and rigid with the machine bed on opposite sides of the work table. The cutters on each column are driven through suitable gearing from a motor 22. Each cutter is of course positioned axially so as to locate its cutting plane accurately and coincident with the work surfaces to be formed.

Figure 2:
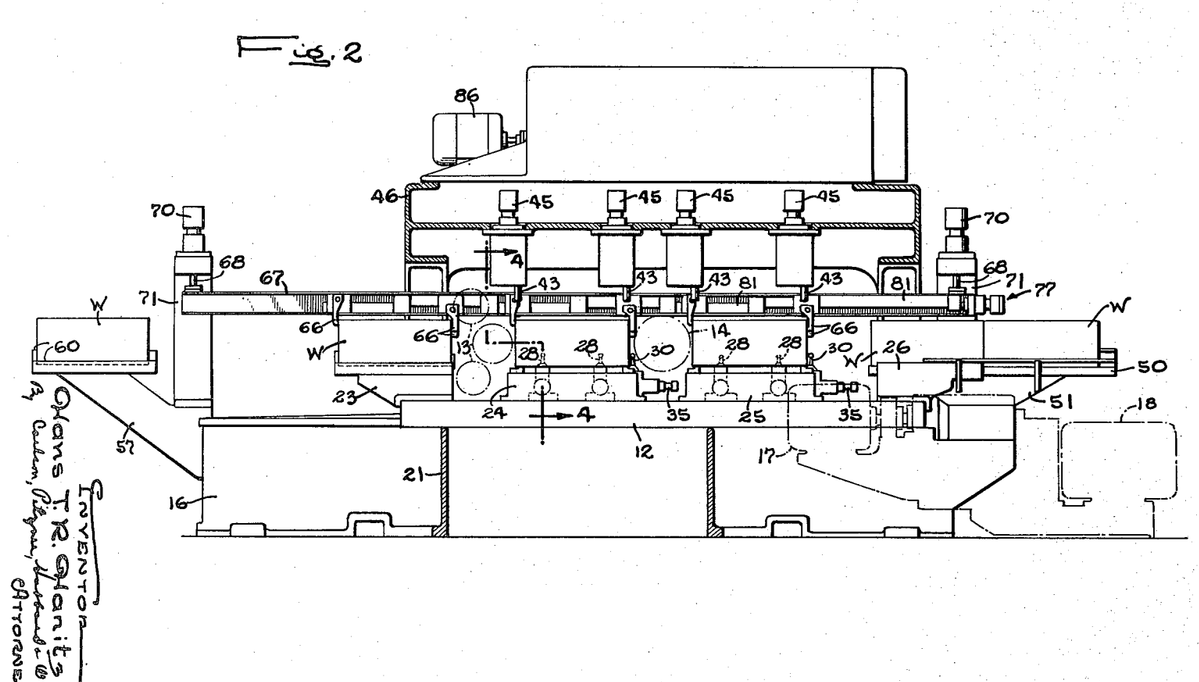
Fig. 2 is a side view of the organization with various parts broken away approximately along the line 2—2 of Fig. 1.

Mounted on and secured rigidly to the top of the table 12 are four work fixtures 23, 24, 25, and 26 spaced apart equal distances which are equal to the stroke of the table. The two intermediate or operating fixtures 24 and 25 in which the workpieces are clamped while being fed past the cutters are adapted to receive workpieces by transferring the latter downwardly in the present instance from an overhead position onto ledges 27 at the four corners of the workpiece bottom. Such lowering of the workpieces brings the table into operative association with two upstanding fingers 28 (Figs. 2 and 4) which enter bottom holes 29 in the workpiece and a similar upstanding finger 30 (Figs. 2 and 5) which is disposed adjacent but slightly beyond the leading end of the workpiece when the latter is seated in the fixture. The latter finger is on the upper end of a lever 31 fulcrumed intermediate its ends in a ball and socket seat 32 on the fixture base and connected at its lower end to the rod 33 of a piston 34 slidable longitudinally of the table 12 in a cylinder 35. When pressure fluid is admitted to the rod end of the cylinder, the rounded upper end of the finger 30 moves into engagement with the workpiece end and shifts the latter along the supporting ledges reversely of the direction of table feed, this movement being limited by the stroke of the piston 34. The workpiece is thus positioned longitudinally of the table so that the transverse diameters of the workpiece holes 29 coincide with the centers of the fingers 28.

Figure 4:
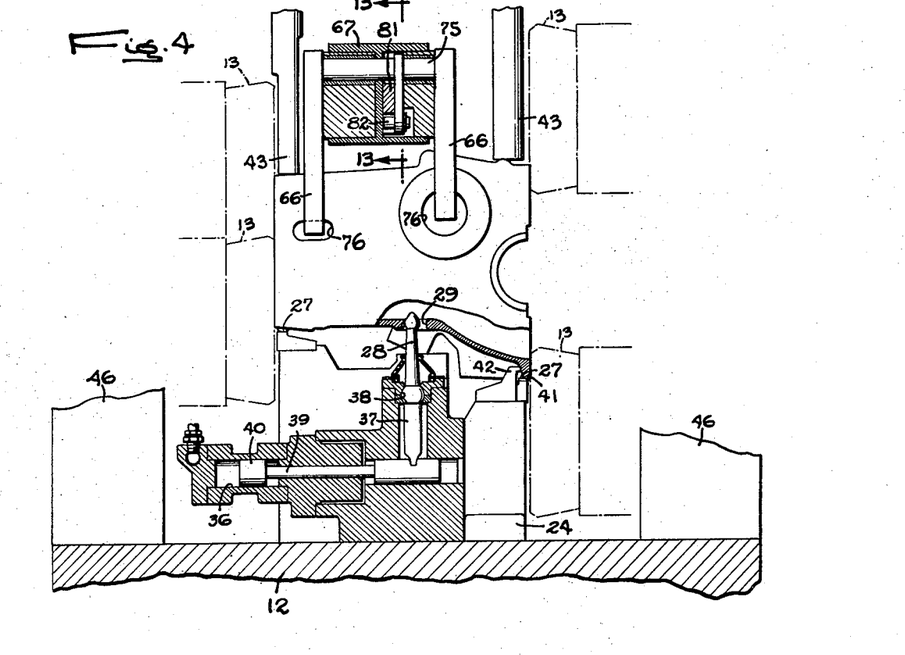
Fig. 4 is a fragmentary sectional view taken along the line 4—4 of Fig. 2.

The two fingers 28 are utilized to position the workpiece laterally of the table and are shifted to the left as viewed in Fig. 4 when pressure fluid is admitted to the head ends of cylinders 36 which are mounted in the fixture base at opposite ends of the workpiece. These fingers are on levers 37 universally fulcrumed intermediate their ends in sockets 38 on the fixture base and connected at their lower ends to the rods 39 of pistons 40 slidable in the cylinders 36. Thus, when the hydraulic actuators are energized, the fingers 28 move against the sidewalls of the holes 29 and shift the workpiece to the left as shown in Fig. 4 until a bottom flange 41 of the workpiece engages locating projections 42 upstanding from the fixture base. The workpiece is thus located accurately thereby positioning the sides of the workpiece parallel to the cutting planes of the cutters for removal of the desired thickness of metal from the piece.

After such transverse positioning, the workpiece is clamped against the fixture ledges 27 by rods 43 projecting downwardly against the top of the workpiece at the four corners thereof. These rods are on pistons 44 reciprocable in cylinders 45 which are supported in an overhead bridge structure 46 (Fig. 1) of inverted U-shape having depending legs secured to the central part of the table so as to move therewith. Rails 47 along the sides of the bridge structure slide in guides in the tool supporting columns 21.

The fixture 26 on the leading or unloading end of the table 12 is adapted to receive a workpiece by lowering thereof from an overhead position onto ledges 48 (Fig. 12) therein but is constructed to permit removal of the workpiece by endwise sliding movement forwardly and in the direction of feed of the table. To this end, the ledges 48 are elongated in the direction of the table movement and the workpiece is guided along the ledges by side rails 49 on the fixture base. There are no clamps or positioning fingers associated with this fixture the base of which is adapted to receive the rearwardly projecting ends 50 of a platform 51 stationarily mounted on the bed 16 beyond the leading end of the table. In the advance of the latter, the fixture 26 moves past the platform ends 50 whose upper surfaces 52 (Fig. 12) are disposed only slightly below the fixture ledges 48.

Figure 5:
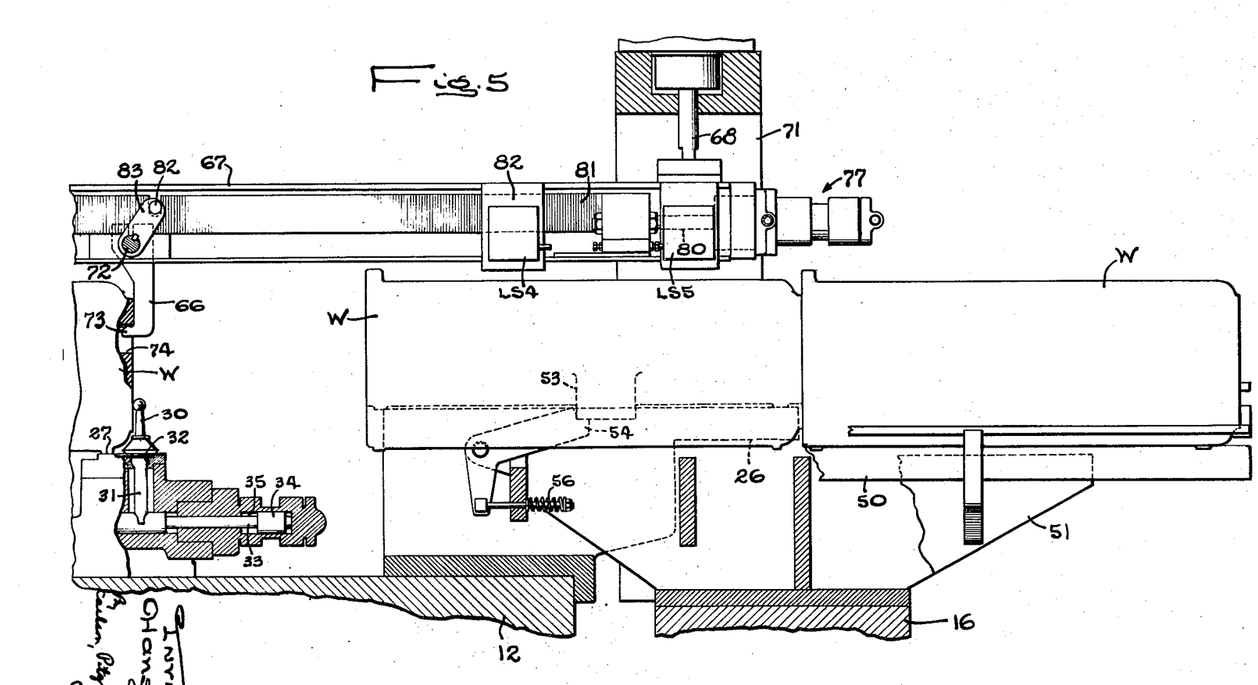
Fig. 5 is a fragmentary sectional view taken along the line 3—3 of Fig. 1, but at the unloading end of the machine.
Figure 12:
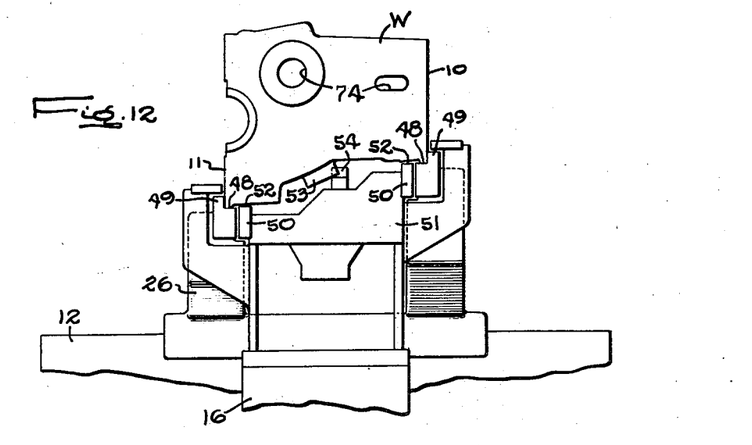
Fig. 12 is a fragmentary end view of the unloading platform.

At the end of the table advance, a depending projection 53 on the workpiece passes a latch 54 pivoted at 55 on the platform and urged upwardly by a spring 56 to the position shown in Fig. 5. The latch thus blocks the workpiece against return when the table is retracted, the workpiece thus becoming transferred onto the surfaces 52 of the platform. Unloading of the finished workpiece is thus facilitated through the provision of the unloading fixture 26 coacting with the elevating mechanism to be described later.

Figure 3:
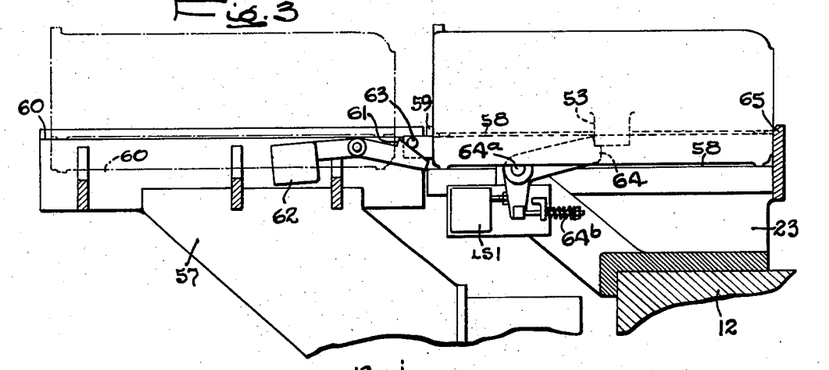
Fig. 3 is a fragmentary sectional view taken along the line 3—3 of Fig. 1 at the loading end.

The fixture 23 at the other or loading end of the work table is constructed to receive a workpiece by endwise sliding of the latter off from a stationary platform 57 (Figs. 1 and 3) when the table is at the end of its return movement. For this purpose, the fixture is formed with side guides 59 and horizontal supporting surfaces 58 which are disposed substantially at the level of rails 60 on the loading platform 57. A workpiece to be loaded is placed on the platform 57 and slides along the rails 60 until the forward end encounters a stop 61 (Fig. 3) urged upwardly by a weight 62. Now when the table becomes fully retracted as shown in Fig. 3, a cross-pin 63 at the end of the fixture 23 engages and depresses the stop 61 to release the workpiece. The guide 58 on the fixture 23 and the supporting surfaces 60 on the platform 57 also come together at their adjacent ends so that the workpiece on the platform may be manually pushed forwardly off from the platform and into the fixture, until a stop 65 is encountered. In this position of the workpiece, a latch 64 pivoted at 64ª on the fixture 23 is swung upwardly by a spring 64ᵇ and in behind the projection 53 on the bottom of the workpiece. The latter is thus held against the stop 65 and thus positioned correctly in the fixture while being carried forwardly in the next advance of the table.

In accordance with the present invention, the workpieces are transferred laterally of the table out of the loading fixture 23 and the two operating fixtures 24 and 25 when the table reaches its most advanced position, held clear of the fixtures while the table is being returned to its retracted position and then transferred back into the operating fixtures 24 and 25 and the unloading fixture 26. Thus, the table may be utilized to transfer the row of workpieces step-by-step through the production line. For this purpose, the workpieces in the respective fixtures are gripped by individual transfer devices 66 mounted, in the illustrated embodiment, on a common support which is supported from the machine bed for bodily vertical movement to raise and lower all of the workpieces simultaneously. Herein, the support is in the form of an elongated bar or beam 67 long enough to overlap all four of the fixtures 23 and 26 and secured at opposite ends to downwardly hanging rods 68. The latter carry pistons 69 (Fig. 6) which slide in vertical cylinders 70 mounted on arms 71 (Figs. 1 and 2) rigid with and upstanding from opposite ends of the machine bed and bent at their upper ends to overlie opposite ends of the table. The upward strokes of the pistons 69 are sufficient to raise the workpieces clear of the fingers 28 and 30 and other parts of the fixtures.

In the present instance, the work gripping devices 66 comprise sets of jaws pivoted on the bar to swing downwardly into engagement with the ends of the workpiece. There are four jaws in each set, two at one end of the workpiece fixed to a rock shaft 72 and formed at their ends with hooked ends 73 adapted to enter holes 74 in the workpiece end as shown in Fig. 5 when the shaft and the jaws are turned clockwise and downwardly from the retracted position shown in Fig. 13. The other two jaws are similarly mounted on a rock shaft 75 and its hooked end enters holes 76 (Fig. 4) in the other end of the workpiece when the jaws are swung downwardly and counterclockwise.

Herein, the jaws of all three sets are actuated simultaneously preferably by a hydraulic servo 77 mounted on one end of the elevator beam 67. Herein, the servo comprises a cylinder 78 (Fig. 6) having a piston 79 whose rod 80 projects longitudinally of the beam and is connected to an actuator bar 81 (Figs. 5 and 13) which is slidable in guides 82 on the beam. At longitudinally spaced points and on opposite side edges, the actuator bar is slotted to receive pins 82 on the free ends of crank arms 83. These arms for the jaws at opposite ends of each workpiece project in opposite directions so that all of the jaws will be swung downwardly to grip the workpieces when the piston rod 80 and actuator bar 81 are shifted to the right as viewed in Fig. 13 when the beam 67 is in its lowered position. As a result, the three workpieces thus engaged become connected to the bar and held in definite positions relative to the latter as the beam is raised and later lowered.

Figure 6:
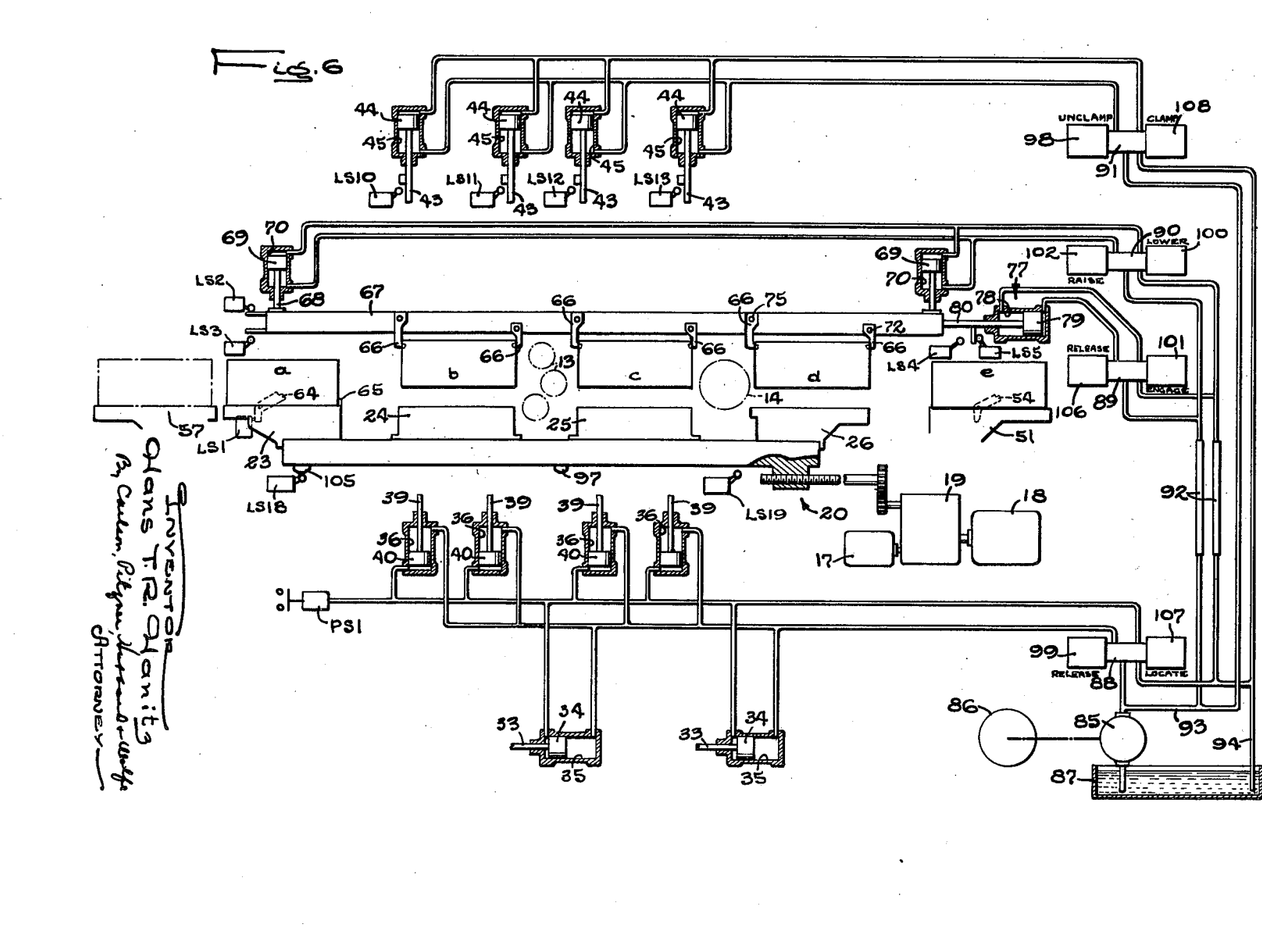
Fig. 6 is a schematic view and diagram of the hydraulic and electrical control mechanism.

The extent of the motions produced by the various hydraulic actuators above described may be positively limited by engagement of the pistons with the ends of the respective cylinders or by the provision of stops coacting with the movable parts. All of the actuators are supplied with pressure fluid from one or more sources such as a pump 85. Because most of the hydraulic actuators are carried by the table 12 in the present machine, the pump, its driving motor 86, the fluid sump 87, and the various hydraulic connections and control valves shown in Fig. 6 are mounted on the bridge member 46. The fluid supply and return conduits for the stationary beam actuators 69, 70 incorporate flexible or sliding parts 92.

The flow of pressure fluid to and from the various actuators is controlled by so-called four-way valves 88 to 91 whose movable members are disposed in a neutral position when two associated actuating solenoids are deenergized. When one solenoid is energized, the valve member is shifted to admit pressure fluid from the supply line 93 to one end of an associated hydraulic cylinder while connecting the other cylinder end to a drain line 94. When the other valve solenoid is energized, the valve reverses the connections between the cylinder ends and the drain and supply lines.

To cause the movable parts to operate in the proper sequence and thereby execute a desired automatic cycle during which successive workpieces are advanced step by step through the successive positions a, b, c and d above referred to and machined in the desired manner, the solenoid valves and the table drive motors are arranged to be controlled by various limit and pressure switches shown in Fig. 6. These switches control the various energizing circuits through conductors which have been omitted for purposes of simplifying the disclosure and because the manner of interconnection of such switches and solenoids and the interlocking of the circuits to insure the desired sequence is well understood in the art.

Operation

Figure 7:
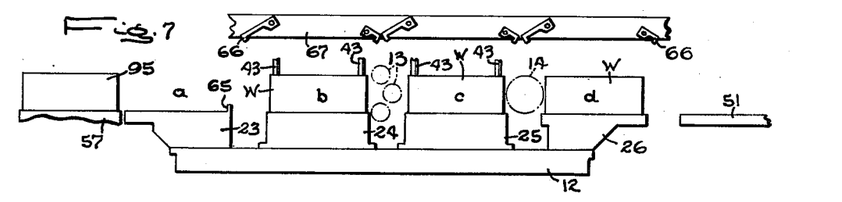
Figs. 7 through 11 are schematic views showing the progress of the work during one machine cycle.

Assuming that the machine tool organization as described above has been in operation so as to bring workpieces into all of the positions on the table and that a machine cycle has been completed, the table will then be retracted as shown in Fig. 7 with workpieces resting in the fixtures 24, 25, and 26 which are disposed in positions b, c, and d respectively. The workpieces in fixtures 24 and 25 will have been positioned by their locating fingers 28 and 30 and the clamps 43 will be energized so that the pieces will be conditioned for operation of the cutters thereon. By this time, the operator will have moved a rough workpiece 95 onto the platform 57 and the previously finished workpiece will have been moved off from the unloading platform 50.

Figure 8:
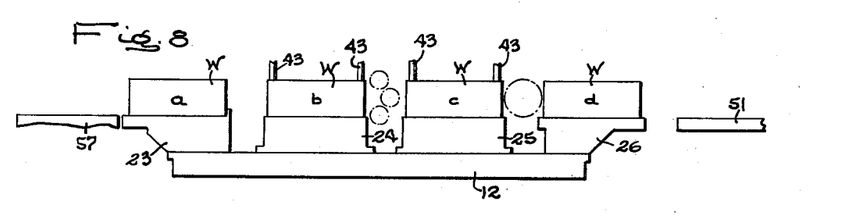

The loading operator then pushes the workpiece 95 forwardly off from the platform 57 and into the fixture 23 as shown in Fig. 8, a switch LS1 (Figs. 3 and 6) being closed when the pieces engage the stop 65 and the latch 64 moves upwardly as shown in Fig. 3. This switch cooperates with a push button switch 96 (Fig. 1) to control the next cycle which is started when the push button is depressed. The feed motor 17 is thus started in a direction to feed the table 12 forwardly. As the table advanuces, the workpiece clamped in the fixture 24 is advanced past the cutters 13 and is rough milled. The piece in the fixture 25 which was rough milled in the previous machine cycle is simultaneously fed past the cutters 14 and finish milled by the latter.

After the workpieces have passed out of engagement with the cutters, the final movement of the table may be completed at a rapid traverse rate if desired by operation of the motor 18 above with the feed motor 17. The motion is terminated in response to actuation of a switch LS19 by a dog 97 when the table reaches the position shown in Fig. 9. In this advanced position of the table, the workpiece which was in the position a at the start of the table advance, will now be disposed in position b preparatory to machining in the next machine cycle. The next two workpieces which are rough and finish milled will be disposed in positions c and d and the workpiece which was finished in the preceding machine cycle and disposed in position d at the start of the instant cycle will have been transferred onto the unloading platform 51.

Figure 9:
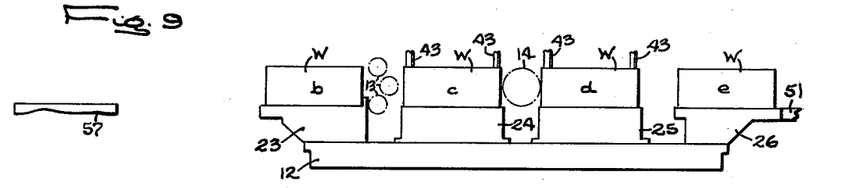

Actuation of the switch LS19 to stop the table also causes energization of solenoids 98, 99, and 100 which actuate the valves 91, 88, and 90, respectively, to admit pressure fluid to the ends of the cylinders 45, 35, 36, and 70 for retracting the clamps 43, releasing the side and end locating fingers 28 and 30, and lower the beam 67. Thus, the workpieces in the fixtures 24 and 25 are thus released and free to be elevated. Closure of a switch LS3 when the beam 67 reaches its lowermost position combined with the table actuated switch LS19 effects energization of the solenoid 101 which shifts the valve 89 to admit pressure fluid to the rod end of the cylinder 78. In the ensuing advance of the actuator bar 81 to the right, all of the jaws 66 are swung downwardly into the holes in the three workpieces in the fixtures 23, 24 and 25, thereby connecting these workpieces to the beam 67.

Figure 10:
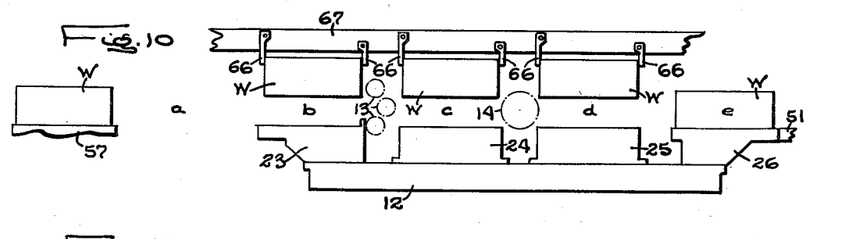

Completion of the jaw-closing motion of the actuator bar 81 results in closure of a switch LS5 which causes energization of a solenoid 102 shifting the valve 90 to admit pressure fluid to the rod ends of the two cylinders 70. This results in raising of the beam 67 and elevation of the workpieces connected thereto out of the fixtures 23, 24, and 25 as shown in Fig. 10. As an incident to this, a switch LS2 closed by the beam operates through appropriate relays to energize the motor 18 and initiate rapid return of the table. In this motion, the fixture 26 then supporting a finished workpiece in the position and above the platform 50 is withdrawn from beneath the workpiece which is held on the platform 50 by the latch 54 and thus becomes transferred onto the platform.

Figure 11:
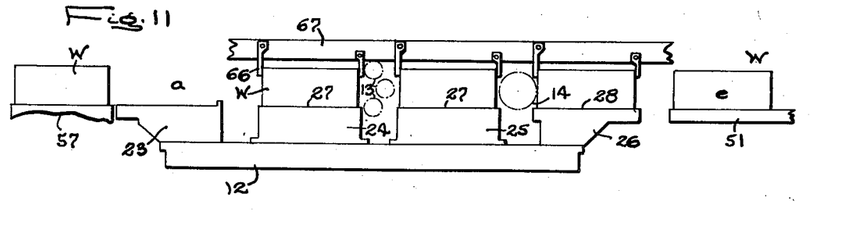

When the table becomes fully retracted as shown in Fig. 6, a switch LS18 is actuated by a dog 105 stopping the actuating motor and terminating the return motion. The switch LS18 also energizes the solenoid 100 thereby shifting the valve 90 to admit fluid to the heads of the cylinders 70 causing lowering of the beam 67. In this movement, the two workpieces suspended from the beam in the b and c positions move into the fixtures 24, 25 and come to rest on the ledges 27 as shown in Fig. 11, the fingers 28 entering the holes 29 in the bottoms of the workpieces and the leading end walls of the pieces passing the fingers 30. The third workpiece suspended from the beam 67 is lowered onto the surfaces 28 in the fixture 26.

Figure 13:
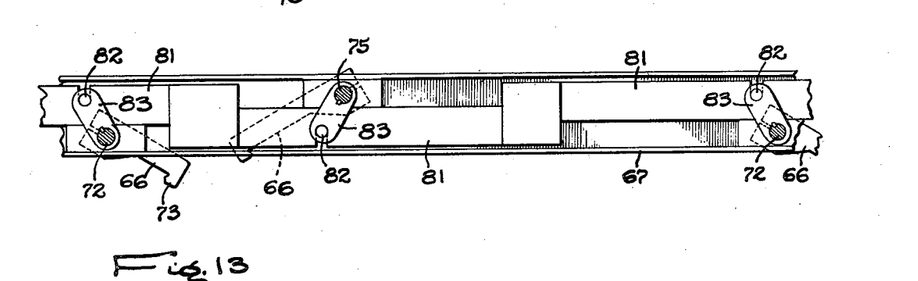
Fig. 13 is a fragmentary section taken along the line 13—13 of Fig. 4.

The switch LS3 which was actuated in the lowering of the beam 67 acts in conjunction with the then closed table actuated switch LS18 to energize the solenoid 106 to shift the valve 89 and thereby cause movement of the bar 81 to the left as viewed in Fig. 13 thereby opening and raising the jaws 66 to disconnect the beam 67 from the workpieces. Completion of the jaw opening results in actuation of a switch LS4 to energize a solenoid 107 to admit pressure fluid through the valve 88 to the head ends of the cylinders 36 for actuating the locating fingers 28 and to the rod ends of the cylinders 35 for actuating the locating fingers 30. The workpieces in each of the fixtures 24 and 25 are thus shifted both endwise and sidewise and thus located accurately in relation to the cutters 13 and 14.

The pressure build-up in the cylinders 35 and 36 following actuation of the locating fingers results in closure of a pressure responsive switch PS1 which causes energization of a solenoid 108 and shifting of the valve 91 to admit pressure fluid to the head ends of the cylinders 45 for projecting the four clamping elements 43 downwardly to lock the workpieces in the fixtures 24 and 25. Final movements of the clamps 43 close switches LS10 to 13 which act jointly to cause energization of the solenoid 102 for actuating the valve 90 to admit fluid to the cylinders 70 for raising the beam 67. This results in closure of the switch LS2 which conditions the starting circuit above described for initiation of the next cycle when the operator again depresses the push button 96 after having moved a new workpiece from the loading platform 53 forwardly into the fixture 23.

I claim as my invention:

1. In a machine tool organization, the combination of, a horizontal work table reciprocable back and forth between advanced and retracted positions, first and second fixtures secured to said table and spaced apart along the latter a distance equal to the stroke of the table, said fixtures being adapted to receive and release workpieces by movement of the latter transversely of the path of movement of said table, elements mounted on said fixtures for movement relative thereto into and out of engagement with the workpieces therein to clamp the latter in the fixtures or release the same for said transverse withdrawal, three transfer devices disposed adjacent and spaced apart along said table distances equal to the stroke of the latter so that two of said devices will be disposed opposite the respective work fixtures when said table is in advanced position or in retracted position, power operated mechanism supporting said transfer devices for movement transversely of the table toward and away from the workpieces in said fixtures, each of said devices including a pair of movable gripping members, and a power actuator movable with said mechanism and operable to move said gripping members into and out of engagement with a workpiece in one of said fixtures in the advanced position of the transfer device whereby to pick up the engaged workpiece and support the same during retraction of the device away from the fixture.

2. A machine tool organization having, in combination, an elongated table mounted for horizontal endwise reciprocation between advanced and retracted positions, power actuated means for feeding said table to said advanced position and returning the same rapidly to said retracted position, two fixtures secured to said table and spaced apart along the latter a distance equal to the stroke of the table, said fixtures being adapted to receive workpieces by movement thereof transversely of the path of travel of the table, a pair of cutters spaced along said table and positioned for engagement with the workpieces in the respective fixtures during feeding of said table to said advanced position whereby to machine the workpieces in both of said fixtures simultaneously during said feeding of the table, three transfer devices disposed adjacent said table and adapted to releasably engage and support workpieces to be machined with the pieces spaced apart along said table distances equal to the table stroke, and power actuated mechanism supporting said transfer devices for movement transversely of the path of table travel into and out of positions of engagement with the respective workpieces, said devices and said mechanisms, when retracted, supporting the workpieces clear of said fixtures to permit said rapid return of said table to said retracted position, each of said transfer devices including a pair of power actuated gripping elements movable relative to the transfer device into and out of engagement with the workpiece in one of said fixtures when the transfer device is advanced into the fixture.

3. A machine tool as defined by claim 2 in which said fixtures open upwardly and said transfer devices are carried on an elongated beam mounted for bodily movement downwardly and upwardly to carry said gripping elements into and out of said fixtures.

HANS T. R. HANITZ.

REFERENCES CITED

The following references are of record in the file of this patent:

UNITED STATES PATENTS

| Number | Name | Date |
|---|---|---|
| 1,218,044 | Beaman | Mar. 6, 1917 |
| 2,004,540 | Smith et al. | June 11, 1935 |
| 2,025,706 | Birkebak | Dec. 31, 1935 |
| 2,142,735 | Rougemont | Jan. 3, 1939 |
| 2,227,145 | Lex et al. | Dec. 31, 1940 |
| 2,302,878 | Muhl et al. | Nov. 24, 1942 |
| 2,379,571 | Gerlach | July 3, 1945 |
| 2,462,235 | Swenton | Feb. 22, 1949 |